US011271722B2

(12) United States Patent
Schat

(10) Patent No.: US 11,271,722 B2
(45) Date of Patent: Mar. 8, 2022

(54) APPARATUSES AND METHODS INVOLVING AUTHENTICATION OF RADAR-BASED DIGITAL DATA STREAM USING CRYPTOGRAPHIC HASHING

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 263 days.

(21) Appl. No.: 16/405,484

(22) Filed: May 7, 2019

(65) Prior Publication Data
US 2020/0358596 A1 Nov. 12, 2020

(51) Int. Cl.
H04L 29/06 (2006.01)
H04L 9/06 (2006.01)
(52) U.S. Cl.
CPC ................. H04L 9/0643 (2013.01)
(58) Field of Classification Search
CPC ................................... H04L 9/0643
See application file for complete search history.

(56) References Cited

U.S. PATENT DOCUMENTS

| 6,269,446 | B1 | 7/2001 | Schumacher et al. |
| 8,006,094 | B2 | 8/2011 | Savitzky et al. |
| 10,200,196 | B1 | 2/2019 | Rodriguez De Castro |

| 2016/0320481 | A1 | 11/2016 | Ling et al. |
| 2016/0327633 | A1 | 11/2016 | Kumar Y.B. et al. |
| 2017/0153314 | A1* | 6/2017 | Siemes ................. G01S 13/325 |

FOREIGN PATENT DOCUMENTS

| CN | 103378966 A | * | 10/2013 | |
| EP | 3355262 A1 | | 8/2018 | |
| WO | WO-2009129621 A1 | * | 10/2009 | ....... G11B 20/00086 |
| WO | WO-2016179421 A1 | * | 11/2016 | ............. H01Q 23/00 |
| WO | WO 2016/207899 A1 | | 12/2016 | |
| WO | WO-2019229519 A1 | * | 12/2019 | ........... H04N 21/835 |

OTHER PUBLICATIONS

N. H. Lestriandoko, T. Juhana and R. Munir, "Security system for surveillance radar network communication using chaos algorithm," 2014 8th International Conference on Telecommunication Systems Services and Applications (TSSA), 2014, pp. 1-6, doi: 10.1109/TSSA.2014.7065947. (Year: 2014).*
Secure Digital Camera, Digital Forensic Research Workshop, 2004, Paul Blythe and Jessica Fridrich (2004).
Low-Cost SHA-1 Hash Function Architecture for RFID Tags, M. O'Neill, Dominikus, S. (ed.) Workshop on RFID Security—RFIDsec. pp. 41-51 (Jul. 2008).

(Continued)

Primary Examiner — Shawnchoy Rahman

(57) ABSTRACT

An apparatus in accordance with embodiments includes front-end radar circuitry and storage circuitry. The front-end radar circuitry generates a digital data stream that represents received radar wave signals and provides a cryptographic hash using the digital data stream, timing information, and apparatus-specific data. The storage circuitry stores the digital data stream and the cryptographic hash indicative of authenticity of the digital data stream.

20 Claims, 6 Drawing Sheets

(56) References Cited

OTHER PUBLICATIONS

"Efficient Hardware Hardware Architecture of SHA-256 Algorithm for Trusted Mobile Computing," Mooseop Kim, Jaecheol Ryou, Sungik Jun, Information Security and Cryptology—Inscrypt, 4th International Conference, Beijing, China, Dec. 14-17. LNCS, vol. 5487, pp. 240-252 (2009).

Spongent: The Design Space of Lightweight Cryptographic Hashing, Andrey Bogdanov, Miroslav Knezevic, Gregor Leander, Deniz Toz, Kerem Varc, and Ingrid Verbauwhede, IEEE Transactions on Computers, vol. 62, No. 10, Oct. 2013, pp. 2041-2053.

Pushing the Limits of SHA-3 Hardware Implementations to Fit on RFID, Peter Pessl, Michael Hutter, Proceedings of the 15th International conference on Cryptographic Hardware and Embedded Systems, pp. 126-141 (2013).

Hardware Design and Implementation of SM3 Hash Algorithm for Financial IC Card, Ye Hu, Liji Wu, An Wang, Beibei Wang, International Conference on Computational Intelligence and Security, pp. 514-518 (2014).

https://www.boschdiagnostics.com/cdr/sites/cdr/files/15-93_cdr_crash_data_retrieval.pdf (2015).

"Securing Video Integrity using Decentralized Trusted Timestamping on the Bitcoin Blockchain," (2016) https://www.gipp.com/wp-content/papercite-data/pdf/gipp2016a.pdf.

Round Gating for Low Energy Block Ciphers, Subhadeep Banik, Andrey Bogdanov, Francesco Regazzoni, Takanori Isobe, Harunaga Hiwatari, Toru Akishita, 2016 IEEE International Symposium on Hardware Oriented Security and Trust (HOST), pp. 55-60.

Area-Efficient and High-Throughput Hardware Implementations of TAV-128 Hash Function for Resource-Constrained IoT Devices, Ramla Ijaz, Muhammad Adeel Pasha, 9th IEEE International Conference on Intelligent Data Acquisition and Advanced Computing Systems: Technology and Applications, Sep. 21-23, 2017, Bucharest, Romania, pp. 832-835.

Danaher, D., "White Paper: Eaton VORAD Collision Warning System: Operation of the Eaton VORAD Collision Warning System and Analysis of the Recorded Data", Oct. 6, 2009.

Ijaz, R., "Area-Efficient and High-Throughput Hardware Implementations of TAV-128 Hash Function for Resource-Constrained IoT Devices", The 9th IEEE International Conference on Intelligent Data Acquisition and Advanced Computing Systems: Technology and Applications, Sep. 21-23, 2017.

\* cited by examiner

APPARATUSES AND METHODS INVOLVING AUTHENTICATION OF RADAR-BASED DIGITAL DATA STREAM USING CRYPTOGRAPHIC HASHING

OVERVIEW

Aspects of various embodiments are directed to authenticating radar-based digital data streams using cryptographic hashing.

In modern automobiles, event data recorders continuously record various car-related data, such as speed, breaking, and steering angle. In an event of an accident, the data up to a few seconds before the accident is permanently stored and can be used in the event of a lawsuit and/or for insurance purposes. Raw radar data, in an automobile radar system, may be helpful for identifying the cause of the accident.

These and other matters have presented challenges to efficiencies of radar-based data implementations, for a variety of applications.

SUMMARY

Various example embodiments are directed to issues such as those addressed above and/or others which may become apparent from the following disclosure concerning generating cryptographic hashes using radar-based digital data streams and authenticating the digital data streams using the cryptographic hashes.

In certain example embodiments, aspects of the present disclosure involve generating cryptographic hash using a digital data stream, timing information of the digital data stream, and apparatus-specific information.

In a more specific example embodiment, an apparatus includes front-end radar circuitry and storage circuitry. The front-end radar circuitry generates a digital data stream that represents received radar wave signals, and provides a cryptographic hash using the digital data stream, timing information, and apparatus-specific data. The storage circuitry stores the digital data stream and the cryptographic hash indicative of authenticity of the digital data stream.

The front-end radar circuitry, in related embodiments, includes a cryptographic hash circuitry to generate and provide the cryptographic hash for storage. For example, the cryptographic hash is generated using the apparatus-specific data including a unique identifier of the front-end radar circuitry and chirp parameters associated with the radar wave signals, and the timing information. The chirp parameters include one or more of a setting of a timing engine and a unique identifier for each chirp. The timing information includes a date and time the radar wave signals are received. The cryptographic hash can be generated using a threshold number of chirps. The front-end radar circuitry further includes transceiver circuitry configured and arranged with an antenna to output signals and receive the radar wave signals indicative of reflections from the output signals, and analog-to-digital converter (ADC) circuitry to generate the digital data stream from a mixture of the output signals (e.g., radar wave signals) and the received radar wave signals.

In various embodiments, the storage circuitry includes a first storage circuit to store the cryptographic hash and a second storage circuit to store the digital data stream. The first storage is arranged on the front-end radar circuitry or external to the apparatus. For example, the first storage circuit includes a one-time programmable (OTP) or other read-only memory circuit to store the cryptographic hash. The second circuit and/or the storage circuitry can include data recorder circuitry arranged with the front-end radar circuitry to store the digital data stream. The data recorder circuitry includes a proprietary data recorder, a secure event data recorder, or processing circuitry of the back-end radar circuitry.

In other embodiments, the storage circuitry includes circuitry external to the front-end radar circuitry. The apparatus further includes communication circuitry configured to transmit the cryptographic hash to the external circuitry for storage. In such embodiments, the cryptographic hash is stored in a secure location that is accessible by other circuitry or the external circuitry for comparison of the cryptographic hash to another cryptographic hash generated using the digital data stream. For example, the external circuitry stores the cryptographic hash, compares another cryptographic hash generated using the stored digital data stream to the cryptographic hash, and in response to a mismatch between the cryptographic hash and the other cryptographic hash, provides an indication of unauthorized modification of the digital data stream.

The apparatus, in many embodiments, further includes the back-end radar circuitry. The front-end radar circuitry provides the digital data stream to back-end radar circuitry. The back-end radar circuitry includes processing circuitry to process the digital data stream by: deriving a target map based on raw data from the radar wave signals, and in response to an indication of the digital data stream being unauthentic based on the digital data stream and the cryptographic hash, instructs the front-end radar circuitry to generate additional digital data.

In another specific example embodiment, a front-end radar circuitry includes transceiver circuitry, ADC circuitry, and cryptographic hash circuitry. The transceiver circuitry is arranged with an antenna to output signals and receive the radar wave signals indicative of reflections from the output signals. The ADC circuitry generates a digital data stream from a mixture of the output signals and the received radar wave signals. The ADC circuitry provides the digital data stream to back-end radar circuitry. The cryptographic hash circuitry generates a cryptographic hash using the digital data stream, timing information, and apparatus-specific data. The-timing information includes a date and time the radar wave signals are received, and the apparatus-specific data includes a unique identifier (ID) of the front-end radar circuitry and chirp parameters associated with the radar wave signals. Example chirp parameters include a setting of a timing engine and a unique ID for each chirp. In various embodiments, the front-end radar circuitry further includes storage circuitry to store the cryptographic hash. In other example embodiments, the cryptographic hash circuitry provides the cryptographic hash to communication circuitry for transmitting to external circuitry.

A number of embodiments are directed to methods of using the above-described apparatuses. An example method includes receiving, by transceiver circuitry of front-end radar circuitry, radar wave signals indicative of reflections from output signals, and generating, by ADC circuitry of the front-end radar circuitry, a digital data stream from a mixture of the output signals and the received radar wave signals. The method further includes generating, by cryptographic hash circuitry, a cryptographic hash using the digital data stream, timing information, and apparatus-specific data. The digital data stream and the cryptographic hash are stored, such as described above. In a number of more specific embodiments, the method further includes providing the digital data stream to back-end radar circuitry, and using the back-end radar circuitry to: derive a target map based on raw data from the radar wave signals, and in response to an indication of the digital data stream being unauthentic, based on the digital data stream and the cryptographic hash, instruct the front-end radar circuitry to generate additional digital data.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
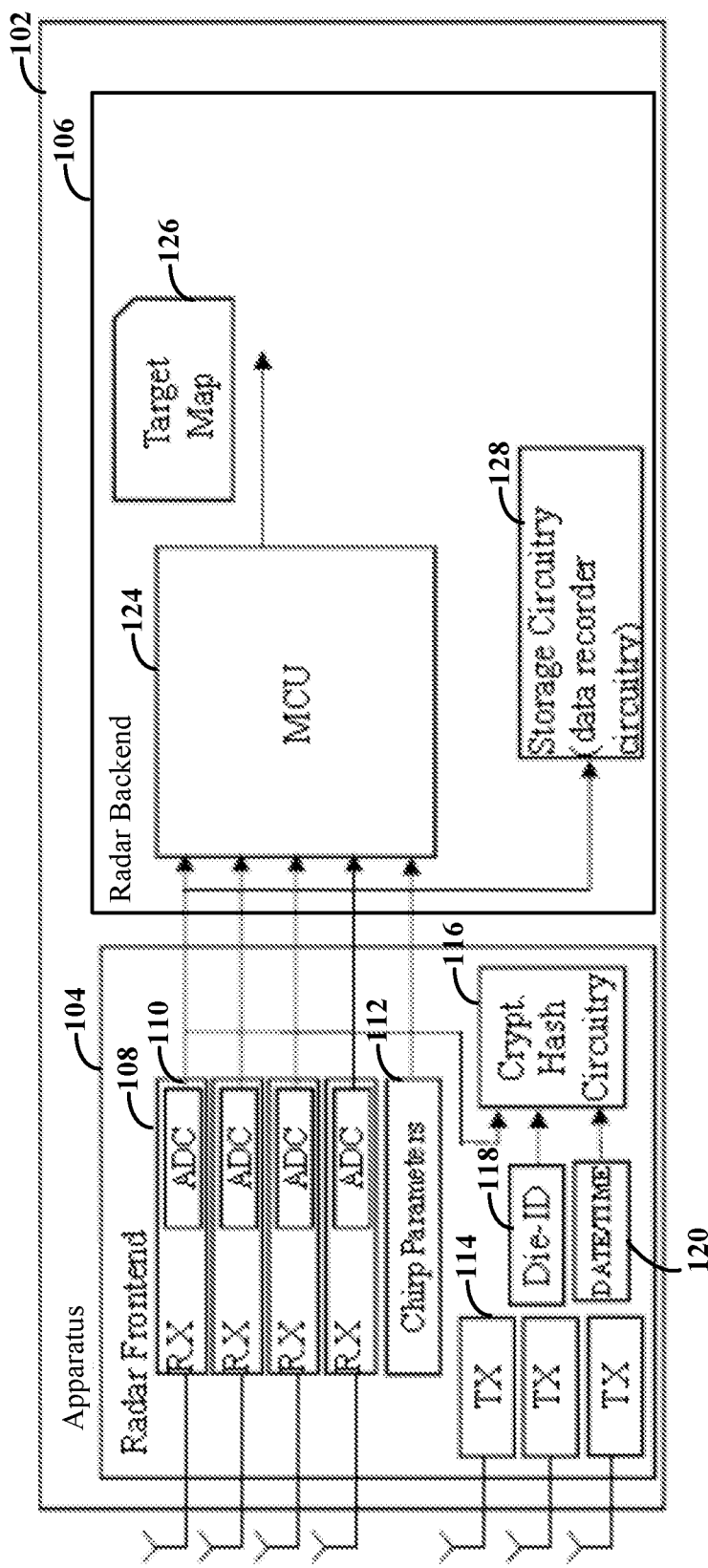
FIG. 1 illustrates an example apparatus for providing a cryptographic hash using a radar-based digital data stream, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving authenticating radar-based digital data streams using cryptographic hashing. In certain implementations, aspects of the present disclosure have been shown to be beneficial when used in the context of generating the cryptographic hash using data that is unique to the apparatus and indicative of the timing of the digital data stream. In some embodiments, the cryptographic hash is provided using the digital data stream, timing information, and apparatus-specific data. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In various radar systems, such as an automobile radar system, event data recorders or other storage circuitry record raw radar data. For example, in an automobile, the event data recorders (EDRs) can continuously record raw radar data, continuously store the raw radar data in an intermediate memory, and in the event of an accident, transfer the raw radar data into a permanent memory which may be useful for identifying the cause of the accident. As the raw radar data can be used in lawsuits and/or insurance purposes, authenticating the raw radar data can be useful to indicate no unauthorized modification of the raw radar data have occurred, such as malicious and/or fraudulent modifications. For example, an automobile owner may attempt to modify the raw radar data to make it appear as though an automobile accident is not their fault and/or is the fault of the automobile manufacturer. Embodiments in accordance with the present disclosure are directed to front-end radar circuitry that creates a cryptographic hash of the raw radar data, herein referred to as a digital data stream. The cryptographic hash generated is used to indicate an authenticity of the digital data stream. The cryptographic hash is stored in a secure location for authentication purposes. For example, the cryptographic hash is transmitted to external circuitry, which is a trusted authority, or stored in a secure one-time programmable (OTP) memory location of the front-end radar circuitry. In various embodiments, the digital data stream is stored on a proprietary data recorder, a secure EDR, or on processing circuitry of the back-end radar circuitry (e.g., memory on a microcontroller). The proprietary data recorder can include a dedicated device, such as or similar to a dashboard camera. The cryptographic hash can be compared to another cryptographic hash which is subsequently generated using the stored digital data stream. If the two hashes match, the digital data stream can be deemed authentic. If there is a mismatch, the digital data stream may be indicated as unauthentic or otherwise having an unauthorized modification. An authorized modification, as used herein, includes or refers to a malicious and/or fraudulent modification, or a modification that is otherwise not authorized by the manufacturer and/or the owner of the apparatus.

A number of embodiments are directed to an apparatus having front-end radar circuitry and storage circuitry. The front-end radar circuitry generates a digital data stream that represents received radar signals and provides a cryptographic hash using the digital data stream, timing information, and apparatus-specific data. For example, the front-end radar circuitry includes cryptographic hashing circuitry that generates and provides the cryptographic hash for storage. The cryptographic hash is generated using a hash function and the respective data. As further described herein, the front-end radar circuitry further includes transceiver circuitry and analog-to-digital (ADC) circuitry. The storage circuitry stores the digital data stream and the cryptographic hash indicative of authenticity of the digital data stream.

The cryptographic hash of the digital data stream is generated using apparatus-specific data and the timing information. The apparatus-specific data includes a unique identifier (ID) of the front-end radar circuitry (e.g., unique die ID) and chirp parameters. The chirp parameters are associated with the radar wave signals and can include one or more of a setting of a timing engine and a unique ID of each chirp. The timing information includes a data and time the radar wave signals are received. In various embodiments, the cryptographic hash is generated using a threshold (e.g., a plurality) number of chirps.

The storage circuitry can include data recorder circuitry to store the digital data stream and other circuitry to store the cryptographic hash. The data recorder circuitry can include a proprietary data recorder, a secure EDR, and processing circuitry of the back-end radar circuitry that is arranged with the front-end radar circuitry. The other circuitry is arranged on the front-end radar circuitry or other external circuitry. For example, the other circuitry is an OTP memory circuit on the front-end radar circuitry that stores the cryptographic hash. In other embodiments, the cryptographic hash is stored on circuitry external to the front-end radar circuitry, and the apparatus includes communication circuitry to transmit the cryptographic hash to the external circuitry. In such embodiments, the cryptographic hash is stored in a secure location, e.g., external circuitry, that is accessible by circuitry for that is accessible by other circuitry for comparison of the cryptographic hash to another cryptographic hash generated using the digital data stream. For example, external circuitry stores the cryptographic hash, compares another cryptographic hash generated using the stored digital data stream to the cryptographic hash, and in response to a mismatch between the cryptographic hash and the other cryptographic hash, provides an indication of unauthorized modification.

In various specific embodiments, the apparatus further includes back-end radar circuitry. The front-end radar circuitry provides the digital data stream to the back-end radar circuitry, which processes the digital data stream. For example, the back-end radar circuitry processes the digital data stream by deriving a target map based on doppler information or similar/equivalent aggregated or intepreted summary of raw data from the radar wave signals, and in response to an indication of the digital data stream being unauthentic based on the digital data stream and the cryptographic hash, instructs the front-end radar circuitry to generate additional digital data, such as increasing time thresholds for recording data.

Other example embodiments are directed to front-end radar circuitry. The front-end radar circuitry includes transceiver circuitry, ADC circuitry, and cryptographic hash circuitry. The transceiver circuitry is arranged with an antenna to output signals and receive the radar wave signals indicative of reflections from the output signals. The ADC circuitry generates a digital data stream from a mixture of the output signals and the received radar wave signals. The ADC circuitry can provide the digital data stream to back-end radar circuitry. The cryptographic hash circuitry generates a cryptographic hash using the digital data stream, timing information, and apparatus-specific data. In various embodiments, the front-end radar circuitry further includes storage circuitry to store the cryptographic hash, although embodiments are not so limited. For example, in a number of embodiments, the cryptographic hash circuitry provides the cryptographic hash to communication circuitry for transmitting to external circuitry.

By generating a cryptographic hash of the digital data stream provided by the ADC circuitry to processing circuitry of the back-end radar circuitry, e.g., a microcontroller, in addition to and/or alternatively to cryptographically hashing the target map, the authenticity of the digital data stream can be verified. For example, the digital data stream can be used to determine causes of an accident or other event. Such data may be indicative of functioning of various systems, such as an automatic emergency breaking system, an autonomous driving system and other manufacturer provided systems. The digital data stream can also provide insight into driver fault. As such, the driver or other personnel may have reasons to attempt to modify the digital data stream, such as for suing the manufacturer or for showing lack of fault for an automobile accident. Cryptographically hashing the target map may allow for modification to the digital data stream to occur. For example, after an accident, a driver may want to modify the crash data to make it appear they are not at fault. A malicious driver may also or alternatively want to provoke an accident to appear as a malfunction of a automobile radar component, in order to sue the manufacturer or for an insurance compensation. As another example, the driver may be forced to use the crash data recording for a company automobile, and makes the data invalid such that it cannot be used against them. Another example, the automobile owner wants to improve the automobile radar performance based on wrong assumptions, for example, that shifting bit weights by one causes double signal strength and detection capability. While the driver or other person may outright destroy the digital data stream, in many instances, destroying the digital data stream may be deemed destroying evidence, and thus the person modifies the data instead of destroying the data.

Various embodiments are directed to methods of using the above-described apparatuses, and/or variations of the same related to generating cryptographic hashes of radar-based digital data streams for authenticating the digital data streams, as further described herein.

Turning now to the figures, FIG. 1 illustrates an example apparatus for providing a cryptographic hash using a radar-based digital data stream, in accordance with the present disclosure. The apparatus 102 is or can include a radar system, such as an automobile radar system, having front-end radar circuitry 104 and storage circuitry 128.

The front-end radar circuitry 104 generates a digital data stream that represents received radar wave signals. The front-end radar circuitry 104 includes transceiver circuitry arranged with an antenna or antennas to output signals that receive the radar wave signals indicative of reflections from the output signals. For example, the transceiver circuitry transmits and receives radar wave signals, sometimes represented as frequency modulated continuous wave (FMCW) signal. As illustrated, the front-end radar circuitry 104 can include front-end receiver circuitry 108 and transmitter circuitry 114 to transmit the radar wave signal and receive reflected radar wave signals. The radar wave signals, as may be appreciated, are sometimes referred to as a frequency ramp signal which is transmitted, hits an object, and comes back to the transceiver circuitry with a given delay. This delay represents the time-of-flight and is used to detect objects and, optionally, estimate their distance from the apparatus 102. For example, both the internal receiver signal and external delayed received signal (e.g., as received by the receiver antenna) are mixed in the receiver 108 (e.g., via receiver mixer or downconverter), and an intermediate frequency (IF) signal is created, representing the distance of the target. Although not illustrated, a chirp generator, such as a phase locked loop (PLL), generates a chirp sequence or ramp by a chirp generator. The chirp or ramp and is provided to both the transmitter circuitry 114 and receiver circuitry 108. This chirp or ramp is a frequency signal that represents or is a FMCW signal which sweeps from the start frequency (F1) to the stop frequency (F2). The analog-to-digital converter (ADC) circuitry 110 converts the IF signal, which is an analog signal, to a digital data stream which is provided to back-end radar circuitry 106.

As shown, the front-end radar circuitry 104 of the apparatus 102 includes a plurality of transmitters, transmit antennas, receivers including ADCs, and receive antennas. For ease of reference, one of each of the transmitters, receivers, and ADCs are labelled, respectively as the transmitter circuitry 114, the receiver circuitry 108, and the ADC circuitry 110. Each of the respective single circuits (e.g., the ADCs, receivers, and transmitters) can include a plurality of circuits. In the specific example, four receivers and four respective ADCs are used to deliver a data stream of, for example, forty Msamples per second for each of the four receiver channels.

As described above, the ADC circuitry 110 generates the digital data stream from a mixture of the output signals and the received radar wave signals. This digital data stream is sometimes herein referred to as the "raw radar data." As further described herein, the ADC circuitry 110 provides the digital data stream to back-end radar circuitry 106 for further processing.

The front-end radar circuitry 104 provides a cryptographic hash using the digital data steam, timing information, and apparatus-specific data. The cryptographic hash can be generated using a hash function and the respective data. Example hash functions include SHA-2, SM3, TAV-128, AES 128, Twine/Feistel, SHA-256, SPONGENT, SHA-1, SHA-3. The digital data stream, timing information, and apparatus-specific data, in specific embodiments, include ADC data (e.g., the digital data stream), chirp parameters 112 associated with the radar wave signals, a unique ID 118 of the front-end radar circuitry, and timing information 120. Example chirp parameters 112 include one or more of a setting of a timing engine associated with the chirps and a unique ID for each chirp. The settings of the timing engine can include an order of the transceivers, a length of the chirp, a phase rotation in the transceiver, etc. The unique ID of the chirp can be used or be indicative of the order of the digital data stream, e.g., the ADC output. The timing information 120 can include a date and time the radar wave signals are received. The unique ID 118 of the front-end radar circuitry can include a unique die ID. The generated cryptographic hash can be used to verify the authenticity of the digital data stream by showing the digital data stream had been created in the actual front-end radar circuitry 104 at the correct data and time, e.g., the data and time of the accident or other event.

The cryptographic hash can be generated using a threshold number of chirps. For example, the cryptographic hash is generated using 10 chirp, 40 chirps, or 50 chirps. As a specific example, with a typical chirp length of 30 µs, a digital data stream rate from the ADC circuitry 110 of 40 MSamples per second, an ADC bit width of 12 Bits (which is 1.5 Bytes) and four receiver ADCs, the digital data stream is:

40*30*40*1.5*4 Byte=288 kBytes long, which ensures sufficient data and can be stored in variety of memory locations, such as the illustrated storage circuitry 128.

In specific embodiments, the front-end radar circuitry 104 includes cryptographic hash circuitry 116 that generates and provides the cryptographic hash for storage. For example, the cryptographic hash circuitry 116 provides the cryptographic hash to the storage circuitry 128 of the apparatus 102, which stores the digital data stream and the cryptographic hash indicative of authenticity of the digital data.

The storage circuitry 128, although illustrated as a single circuit located on the back-end radar circuitry 106, can include two different storage circuits at different locations in various embodiments. The cryptographic hash can be provided for storage internal to the apparatus 102 or external to the apparatus 102 in various embodiments, as further described herein. For example, the cryptographic hash can be stored on the front-end radar circuitry 104 or an external trusted authority. In a specific embodiment, the cryptographic hash is stored in a secure location that is accessible by other circuitry for comparison of the cryptographic hash to another cryptographic hash generated uses the digital data stream. A mismatch between the cryptographic hash and other crptographic hash indicates an unauthorized modication of the digital data stream, such as a malicious and/or fraudulent modification of the digital data stream.

As described above, the storage circuitry 128 stores the digital data stream, in accordance with various embodiments. The storage circuitry 128 can include data recorder circuitry arranged with the front-end radar circuitry 104 to store the digital data stream. The data recorder circuitry includes a proprietary data recorder, a secure EDR, and/or processing circuitry of the back-end radar circuitry, such as the illustrated microcontroller (MCU) 124. In a specific embodiment, although not illustrated by FIG. 1, the storage circuitry 128 includes a first storage circuit arranged on the front-end radar circuitry 104 and a second storage circuit. The first storage circuit stores the cryptographic hash and the second storage circuit stores the digital data stream. The second storage circuit can be located on the back-end radar circuitry 106, and which includes the data recorder circuitry, in various embodiments. In related and more specific embodiments, the first storage circuit includes an OTP memory circuit to store the cryptographic hash or external circuitry.

The apparatus 102 further includes back-end radar circuitry 106 that processes the digital data stream using processing circuitry. The back-end radar circuitry 106 includes processing circuitry, such as the MCU 124, that is used to derive a target map 126 based on doppler information or similar/equivalent aggregated or intepreted summary of the digital data stream (e.g., raw radar data) from the radar wave signals. As described above, the target map 126 can include information indicative of detected objects and, optionally, their estimated distance from the apparatus 102. In various embodiments, the target map 126 may additionally be stored and cryptographically hashed. In specific embodiments, the target map 126 can be generated using two dimensional fast Fourier transform (2D-FFT) and which shows, for each target, the target's position and velocity relative to the apparatus 102. In specific embodiments, the target map 126 is transferred to a display for the user, and/or evaluated by a driver assistance system or an autonomous driving system.

The back-end radar circuitry 106 and/or external circuitry can provide an indication of authenticity of the digital data stream based on the digital data stream and the cryptographic hash. For example, in response to a mismatch between the stored cryptographic hash and another cryptographic hash (subsequently) generated using the digital data stream, the back-end radar circuitry 106, via the MCU 124, and/or the external circuitry can provide an indication that the digital data stream is unauthentic. An unauthentic digital data stream may indicate the digital data stream has a modification that is not authorized by the manufacturer of the apparatus 102 or the owner of the apparatus 102, such as a malicious, fraudulent, or otherwise unauthorized modification. In response to a match, the back-end radar circuitry 106, via the MCU 124, and/or the external circuitry can provide an indication that the digital data stream is authentic.

In more specific and related embodiments, in response to an indication that the digital data stream is unauthentic, the MCU 124 and/or external circuitry can instruct the front-end radar circuitry 104 to generate additional digital data. For example, in an automobile radar system, the MCU 124 instructs the front-end radar circuitry 104 to increase time thresholds to protect an owner from an accident and/or from being sued for alleged wrongful driving behavior and/or to protect the manufacturer of the automobile from being sued for alleged system malfunction. In related embodiments, the user may instruct the front-end radar circuitry 104 to increase time thresholds, such as when a third person is driving the automobile. For example, when an employee is using a company car, the time thresholds for storing the digital data stream may be increased to protect the company.

In embodiments in which the storage circuitry 128 and/or part of the storage circuitry 128 is external to the apparatus 102, the apparatus 102 includes communication circuitry to transmit the cryptographic hash to the external circuitry for storage. In such embodiments, the external circuitry stores the cryptographic hash, and compares another cryptographic hash generated using the stored digital data stream to the cryptographic hash. The other cryptographic hash can be generated by the back-end radar circuitry 106 (e.g., via the MCU 124) and communicated to the external circuitry, or the back-end radar circuitry communicates the digital data stream to the external circuitry for generating the other crypotographic hash for comparison. In response to a mismatch between the cryptographic hash and the other cryptographic hash, the external circuitry provides an indication of unauthorized modification (e.g., malicious and/or fraudulent modification) and/or that the digital data stream is otherwise not authentic. In response to a match, the external circuitry provides an indication that the digital data stream is authentic, such as to the apparatus 102 and/or other circuitry. The stored digital data stream or the other cryptographic hash may be communicated to the external circuitry. For example, the apparatus 102 may automatically communicate the same or the stored digital data stream may be accessed and communicated, such as responsive to an automotive accident. Alternatively, the back-end radar circuitry 106 can perform the comparison, and the external circuitry can communicate the stored cryptographic hash and, optionally, the other cryptographic hash, to the back-end radar circuitry 106.

The hash is a cryptographic hash in order to ensure that a malicious person cannot create or reduce the opportunity for the malicious person involved in the recorded accident to create a fake digital data (e.g., raw data image) that leads to the same hash as the actual raw data—a cryptographic hash results in the inability to create fake raw data with reasonable calculation effort. As previously described, the malicious person may be motivated to modify the digital data stream for a variety of purposes, such as making it appear as though they are not at fault for an accident and/or that the manufacturer is at fault. Finding such raw image data requires prohibitively high calculation power, hence finding a raw data image which is favorable for the malicious person and leads to the same cryptographic hash, is complex by many orders of magnitude. As the raw data includes the unique die-ID and the timing information, e.g., date and time, of the accident or other event, these are protected from modification with the same strength as the radar raw data, e.g., the digital data stream. As described herein, the cryptographic hash can be calculated by an existing processing circuitry, such as the MCU, and is hence realized by a piece of software, or it is realized by a dedicated hardware circuitry. Front-end radar circuitry can have some digital functionality for controlling the radio frequency (RF) part and for conditioning the output data of the ADC before outputting them, but may not have a dedicated processing circuitry, such as an MCU or central processing unit (CPU). The reason is that a front-end radar circuitry is a process optimized for the RF front-end, such that any digital circuit on such an integrated circuit (IC) is less powerful than as if it were implemented on a dedicated IC, fabricated in a process optimized for digital logic.

Accordingly, a cryptographic hash function running on the front-end radar circuitry 104 can be realized in dedicated hardware circuitry. In typical hashing standards, many functions can be serialized, thus re-using parts of the hardware for successively calculating the cryptographic hash. This reduces the area of the cryptographic hashing circuitry 116, and also increases the throughput time.

Figure 2A:
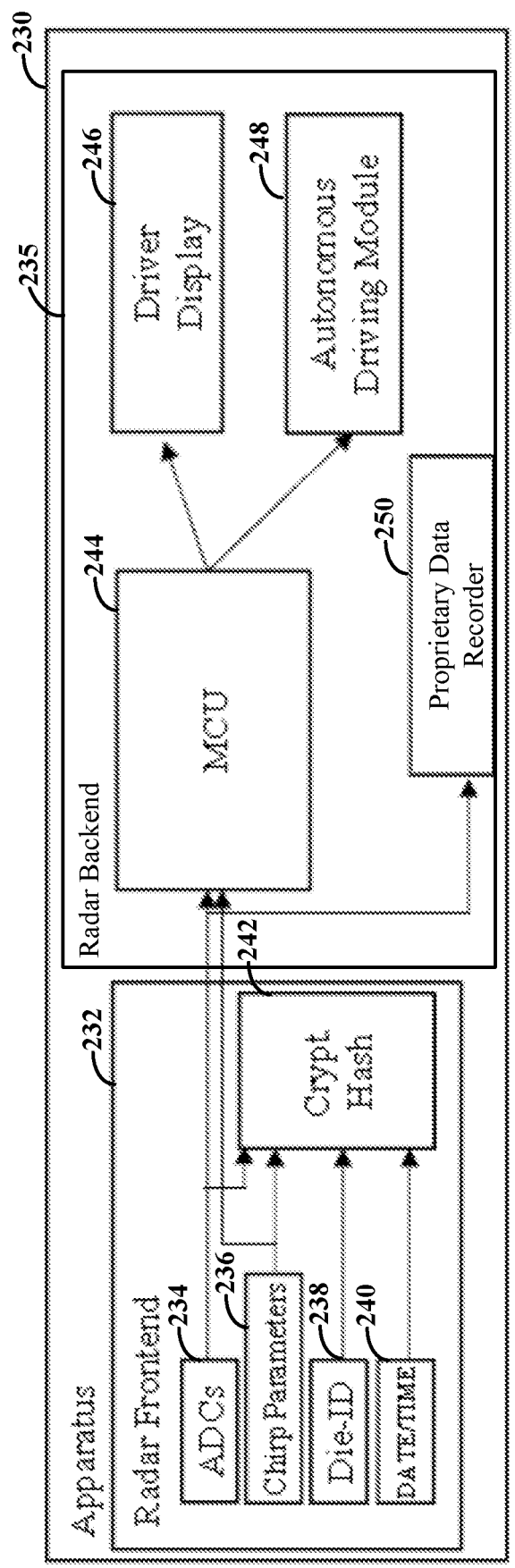
FIGS. 2A-2C illustrate example apparatuses for providing cryptographic hashes and storing digital data streams, in accordance with the present disclosure.
Figure 2B:
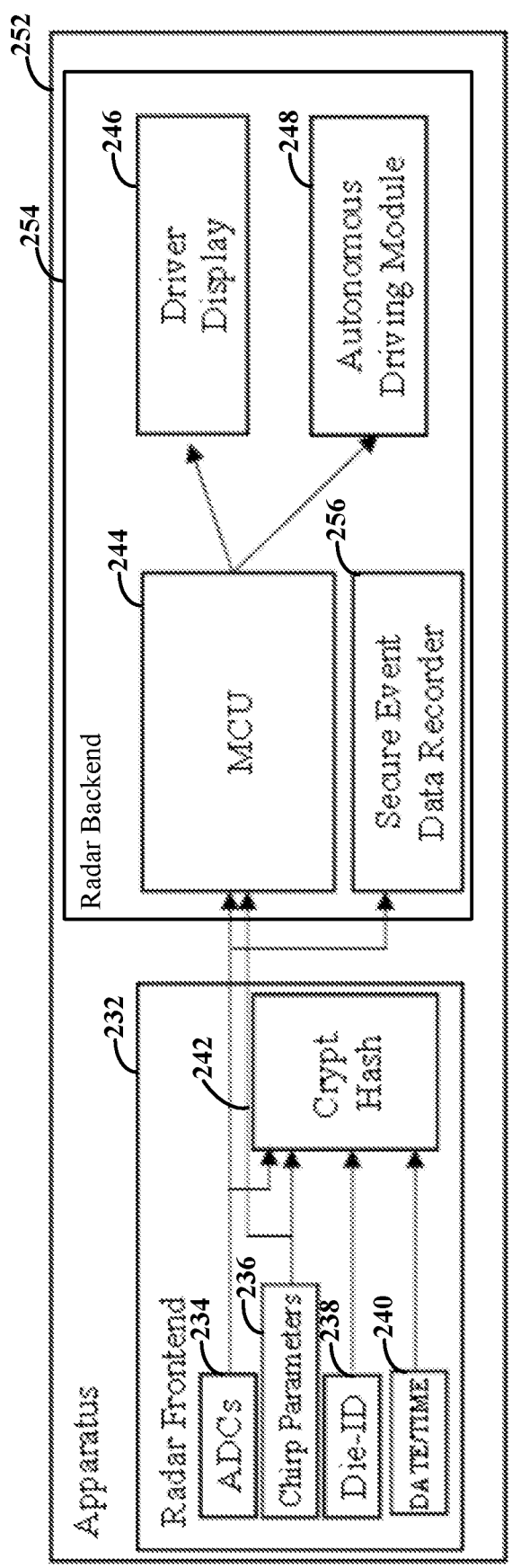
Figure 2C:
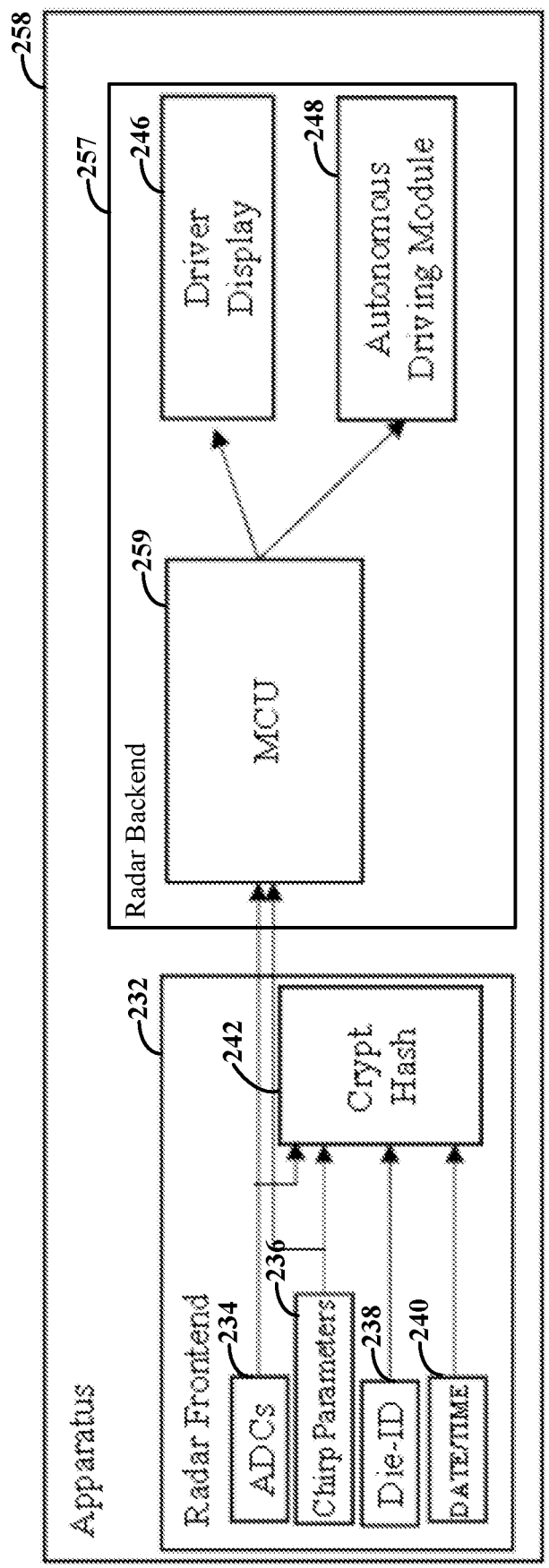

FIGS. 2A-2C illustrate example apparatuses for providing cryptographic hashes and storing digital data streams, in accordance with the present disclosure. The apparatuses 230, 252, 258 are similar to the apparatus 102 illustrated by FIG. 1 including the front-end radar circuitry 104, storage circuitry 128, and optionally, the back-end radar circuitry 106, with variations in the specific type of storage circuitry 128 for storing the digital data stream from the ADC circuitry 110.

In each of the embodiments illustrated by FIGS. 2A-2C, the apparatuses 230, 252, 258 include front-end radar circuitry 232 having receivers with ADC circuitry 234 that provide the digital data stream to an MCU 244, 259 of the back-end radar circuitry 235, 254, 257 for processing to a target input map. In specific embodiments, the target map is transferred to a display 246 for the driver, and/or evaluated by a driver assistance system or an autonomous driving system 248. The digital data stream from the ADC circuitry 234 is further provided to the cryptographic hash circuitry 242 for generating a cryptographic hash using the digital data stream, chirp parameters 236, the unique die ID 238 and timing information 240, as previously described in connection with FIG. 1. For example, the timing information 240 includes the time the radar wave signals are received, and in some embodiments can include milliseconds and microseconds.

FIG. 2A specifically illustrates an example in which the storage circuitry for storing the digital data stream from the ADC circuitry 234 is a proprietary data recorder circuitry 250. The proprietary data record circuitry may be unsecure. FIG. 2B illustrates an example in which the storage circuitry for storing the digital data stream is a secure EDR 256. The secure EDR 256 may be tamper-proof or otherwise resistant to tampering. FIG. 2C further illustrates an example in which the storage circuitry is the MCU 259 itself. For example, the digital data stream is stored in a memory location of the MCU 259, such as unsecure static random-access memory (SRAM).

Figure 3A:
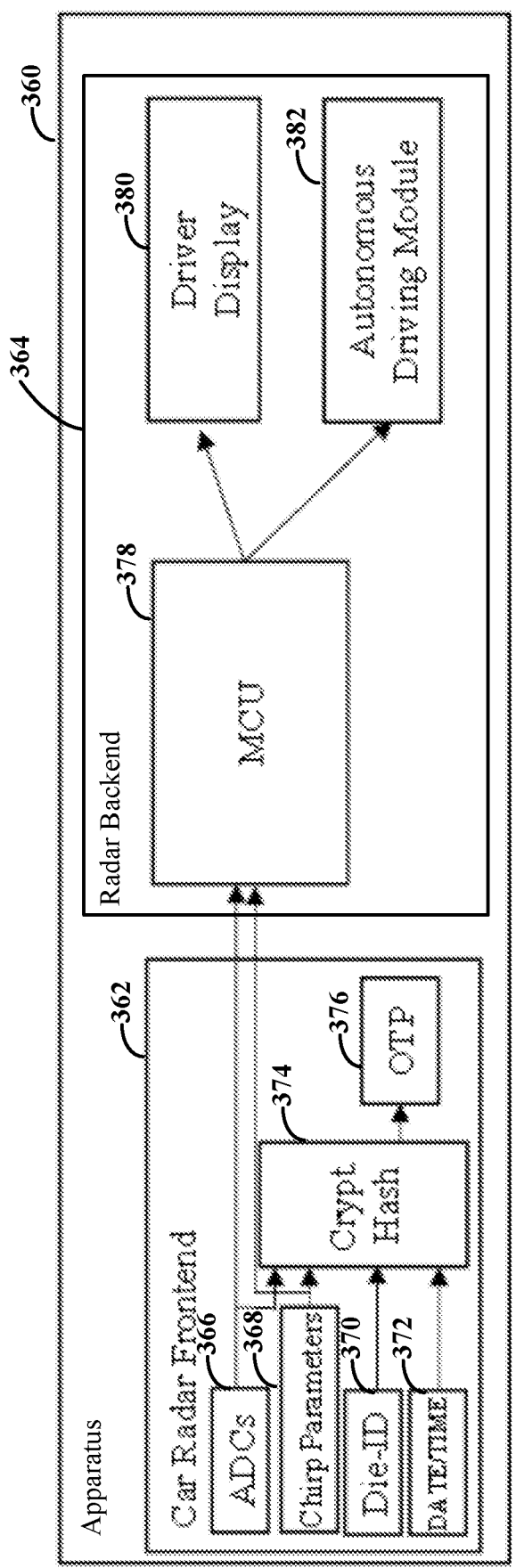
FIGS. 3A-3B illustrate example apparatuses for storing the cryptographic hashes, in accordance with the present disclosure in accordance with the present disclosure.
Figure 3B:
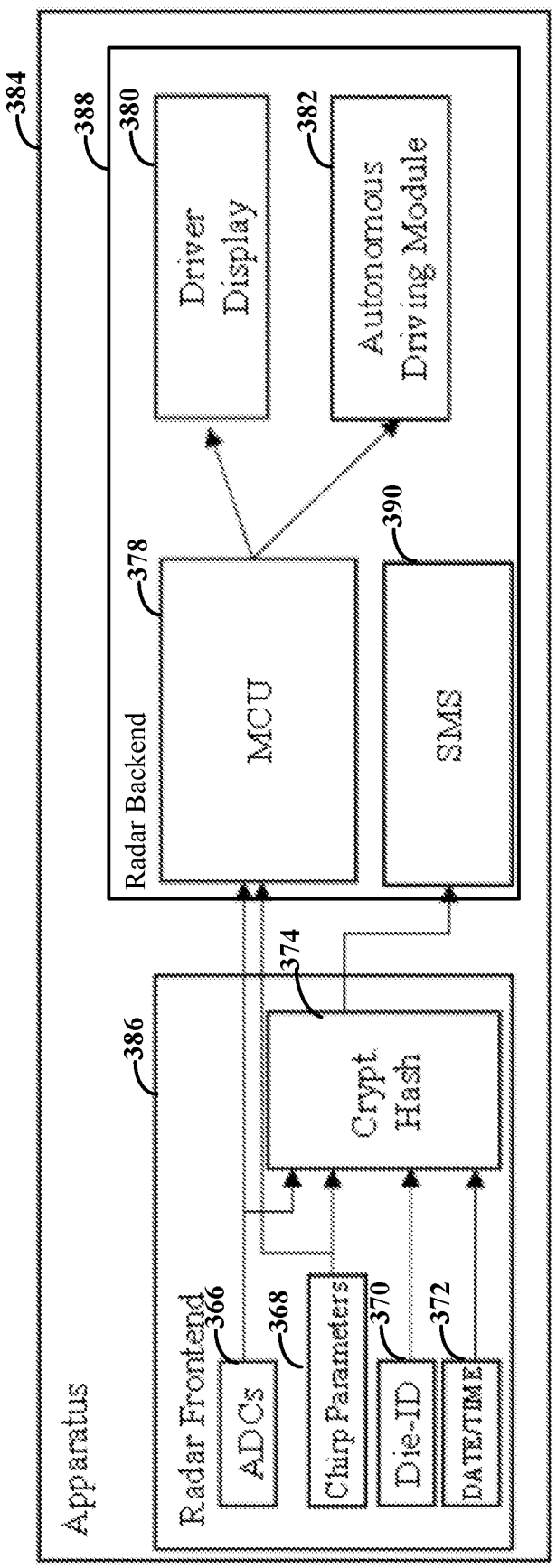

FIGS. 3A-3B illustrate example apparatuses for storing the cryptographic hashes, in accordance with the present disclosure in accordance with the present disclosure. The apparatuses 360 and 384 are similar to the apparatus 102 illustrated by FIG. 1 including the front-end radar circuitry 104, storage circuitry 128, and optionally, the back-end radar circuitry 106, with variations in the specific type of storage locations for securely storing the cryptographic hash.

In each of the embodiments illustrated by FIGS. 3A-3B, the apparatuses 360, 384 include front-end radar circuitry 362, 386 having receivers with ADC circuitry 366 that provide the digital data stream to an MCU 378 of the back-end radar circuitry 364, 388 for processing to a target input map. In specific embodiments, the target map is transferred to a display 380 for the driver, and/or evaluated by a driver assistance system or an autonomous driving system 382. The digital data stream from the ADC circuitry 366 is provided to the cryptographic hash circuitry 374 for generating a cryptographic hash using the digital data stream, chirp parameters 368, the unique die ID 370 and timing information 372, as previously described in connection with FIG. 1.

The cryptographic hash can be stored in secure manner. For example, FIG. 3A illustrates the cryptographic hash stored on the front-end radar circuitry 362, such as on random-access memory (RAM). The RAM can include an OTP memory 376, that is optionally disabled for further writing after storing the cryptographic hash. FIG. 3B illustrates an example in which the cryptographic hash is stored on a trusted authority which provides the hash with a time stamp and stores for later authentication of the digital data stream. As shown, the back-end radar circuitry 388 can include communication circuitry, such as the illustrated short message service (SMS) 390 communication or other communications such as email that communicates the cryptographic hash to external circuitry for later authentication of the stored digital data stream, which may be stored in accordance with the embodiments described by FIGS. 2A-2C.

A number of embodiments are directed to methods of using the above-described apparatuses. An example method includes receiving, by transceiver circuitry of the front-end radar circuitry, radar wave signals indicative of reflections from output signals, and generating, by ADC circuitry of the front-end radar circuitry, a digital data stream from a mixture of the output signals and the received radar wave signals. The method further includes generating, by cryptographic hash circuitry, a cryptographic hash using the digital data stream, timing information, and apparatus-specific data. The digital data stream and the cryptographic hash are stored, such as described above. In a number of more specific embodiments, the method further includes providing the digital data stream to back-end radar circuitry, and using the back-end radar circuitry to: derive a target map based on raw data from the radar wave signals, and in response to an indication of the digital data stream being unauthentic, based on the digital data stream and the cryptographic hash, instruct the front-end radar circuitry to generate additional digital data.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, circuitry and/or other circuit-type depictions (e.g., reference numerals 116, 124, and 128 of FIG. 1 depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 2A-2C and/or 3A-3B. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the storage of the digital data stream as illustrated by one of FIGS. 2A-2C can be used in combination with the storage of the cryptographic hash illustrated by FIGS. 3A-3B. As a specific example, the data stream can be stored on a proprietary data recorder 250 illustrated by FIG. 2A and the cryptographic hash can be stored on the OTP 376 illustrated by FIG. 3A. As another example, the data stream can be stored on a proprietary data recorder 250 illustrated by FIG. 2A and the cryptographic hash can be stored external circuitry as communicated using SMS 390 illustrated by FIG. 3B. As further example, the data stream can be stored on a secure EDR 256 illustrated by FIG. 2B and the cryptographic hash can be stored on the OTP 376 illustrated by FIG. 3A. Such modifications do not depart from the true spirit and scope of various aspects of the disclosure, including aspects set forth in the claims.

What is claimed is:

1. An apparatus comprising:
    front-end radar circuitry configured and arranged to:
        generate a digital data stream that represents received radar wave signals; and
        provide a cryptographic hash using the digital data stream, timing information, and apparatus-specific data;
        generate the cryptographic hash using a threshold number of chirps; and
    storage circuitry configured and arranged to store the digital data stream and the cryptographic hash which is indicative of authenticity of the digital data stream.

2. The apparatus of claim 1, wherein the front-end radar circuitry is configured and arranged to provide the digital data stream to back-end radar circuitry, the apparatus further including the back-end radar circuitry having processing circuitry configured and arranged to process the digital data stream by:
    deriving a target map based on raw data from the radar wave signals; and
    in response to an indication of the digital data stream being unauthentic based on the digital data stream and the cryptographic hash, instruct the front-end radar circuitry to generate additional digital data.

3. The apparatus of claim 1, wherein the front-end radar circuitry includes cryptographic hash circuitry configured and arranged to generate and provide the cryptographic hash for storage.

4. The apparatus of claim 1, wherein the front-end radar circuitry is configured and arranged to generate the cryptographic hash using the apparatus-specific data including a unique identifier of the front-end radar circuitry and chirp parameters associated with the radar wave signals.

5. The apparatus of claim 1, wherein the front-end radar circuitry is configured and arranged to generate the cryptographic hash using the apparatus-specific data including chirp parameters associated with the radar wave signals, the chirp parameters including one or more of a setting of a timing engine and a unique identifier for each chirp.

6. The apparatus of claim 1, wherein the storage circuitry includes data recorder circuitry configured and arranged with the front-end radar circuitry to store the digital data stream, the data recorder circuitry being selected from: a proprietary data recorder, a secure event data recorder, and a memory circuit of back-end radar circuitry.

7. The apparatus of claim 1, wherein the front-end radar circuitry includes:
 transceiver circuitry configured and arranged with an antenna to output signals and receive the radar wave signals indicative of reflections from the output signals;
 analog-to-digital converter (ADC) circuitry configured and arranged to generate the digital data stream from a mixture of the output signals and the received radar wave signals; and
 cryptographic hash circuitry configured and arranged to generate the cryptographic hash.

8. The apparatus of claim 1, wherein the storage circuitry includes a first storage circuit arranged on the front-end radar circuitry and a second storage circuit, the first storage circuit being configured and arranged to store the cryptographic hash and the second storage circuit configured and arranged to store the digital data stream.

9. The apparatus of claim 8, wherein the first storage circuit includes a one-time programmable memory circuit configured and arranged to store the cryptographic hash.

10. The apparatus of claim 1, wherein the cryptographic hash is stored in a secure location that is accessible by other circuitry for comparison of the cryptographic hash to another cryptographic hash generated using the digital data stream.

11. The apparatus of claim 1, wherein the storage circuitry includes circuitry external to the front-end radar circuitry, the apparatus further including communication circuitry configured and arranged to transmit the cryptographic hash to the external circuitry for storage.

12. The apparatus of claim 11, wherein the external circuitry is configured and arranged to:
 store the cryptographic hash;
 compare another cryptographic hash generated using the stored digital data stream to the cryptographic hash; and
 in response to a mismatch between the cryptographic hash and the other cryptographic hash, provide an indication of unauthorized modification.

13. Front-end radar circuitry, including:
 transceiver circuitry configured and arranged with an antenna to output signals and receive the radar wave signals indicative of reflections from the output signals;
 analog-to-digital converter (ADC) circuitry configured and arranged to generate a digital data stream from a mixture of the output signals and the received radar wave signals; and
 cryptographic hash circuitry configured and arranged with the ADC to generate a cryptographic hash using the digital data stream, timing information, and apparatus-specific data, wherein the timing information includes a date and time the radar wave signals are received and the apparatus-specific data includes a unique identifier of the front-end radar circuitry and chirp parameters associated with the radar wave signals, the chirp parameters including a setting of a timing engine and a unique identifier for each chirp.

14. The circuitry of claim 13, further including storage circuitry configured and arranged to store the cryptographic hash, and wherein the ADC circuitry is configured to provide the digital data stream to back-end radar circuitry.

15. The circuitry of claim 13, wherein cryptographic hash circuitry is configured and arranged to provide the cryptographic hash to communication circuitry for transmitting to external circuitry.

16. A method for use with front-end radar circuitry, the method comprising:
 receiving, by transceiver circuitry of the front-end radar circuitry, radar wave signals indicative of reflections from output signals;
 generating, by analog-to-digital converter (ADC) circuitry of the front-end radar circuitry, a digital data stream from a mixture of the output signals and the received radar wave signals;
 generating, by cryptographic hash circuitry, a cryptographic hash using the digital data stream, timing information, and apparatus-specific data; and
 providing the digital data stream to back-end radar circuitry, and
 using the back-end radar circuitry to:
  derive a target map based on raw data from the radar wave signals; and
  in response to an indication of unauthorized modification of the digital data stream based on the digital data stream and the cryptographic hash, instruct the front-end radar circuitry to generate additional digital data.

17. The method of claim 16, further including storing the digital data stream and the cryptographic hash.

18. An apparatus comprising:
 front-end radar circuitry configured and arranged to:
  generate a digital data stream that represents received radar wave signals; and
  provide a cryptographic hash using the digital data stream, timing information, and apparatus-specific data;
  provide the digital data stream to back-end radar circuitry, the apparatus further including the back-end radar circuitry having processing circuitry configured and arranged to process the digital data stream by:
   deriving a target map based on raw data from the radar wave signals; and
   in response to an indication of the digital data stream being unauthentic based on the digital data stream and the cryptographic hash, instruct the front-end radar circuitry to generate additional digital data; and storage circuitry configured and arranged to store the digital data stream and the cryptographic hash which is indicative of authenticity of the digital data stream.

19. The apparatus of claim 18, wherein the front-end radar circuitry is configured and arranged to generate the cryptographic hash using the apparatus-specific data including a unique identifier of the front-end radar circuitry and chirp parameters associated with the radar wave signals.

20. The apparatus of claim 18, wherein the front-end radar circuitry includes:
- transceiver circuitry configured and arranged with an antenna to output signals and receive the radar wave signals indicative of reflections from the output signals;
- analog-to-digital converter (ADC) circuitry configured and arranged to generate the digital data stream from a mixture of the output signals and the received radar wave signals; and
- cryptographic hash circuitry configured and arranged to generate the cryptographic hash.

* * * * *